US011251936B2

(12) United States Patent
Lakshmanan et al.

(10) Patent No.: US 11,251,936 B2
(45) Date of Patent: Feb. 15, 2022

(54) SYSTEM AND METHOD FOR PERFORMING HOMOMORPHIC AGGREGATION OVER ENCRYPTED DATA

(71) Applicant: Cognizant Technology Solutions India Pvt. Ltd., Chennai (IN)

(72) Inventors: Babu Chinniah Lakshmanan, Chennai (IN); Prasad Soundararajan, Chennai (IN); Velayudhaperumal Tamilarasi Karthik Kumar, Chennai (IN); Semeerali Koniyath, Kerala (IN)

(73) Assignee: COGNIZANT TECHNOLOGY SOLUTIONS INDIA PVT. LTD, Chennai (IN)

( * ) Notice: Subject to any disclaimer, the term of this patent is extended or adjusted under 35 U.S.C. 154(b) by 149 days.

(21) Appl. No.: 16/740,550

(22) Filed: Jan. 13, 2020

(65) Prior Publication Data
US 2021/0143975 A1 May 13, 2021

(30) Foreign Application Priority Data
Nov. 7, 2019 (IN) .............................. 201941045254

(51) Int. Cl.
*H04L 9/00* (2006.01)
*H04L 9/08* (2006.01)
*G06F 21/60* (2013.01)

(52) U.S. Cl.
CPC ............ *H04L 9/008* (2013.01); *G06F 21/602* (2013.01); *H04L 9/0861* (2013.01); *H04L 2209/24* (2013.01)

(58) Field of Classification Search
CPC ... H04L 9/008; H04L 9/0861; H04L 2209/24; G06F 21/602
See application file for complete search history.

(56) References Cited

U.S. PATENT DOCUMENTS

| 8,565,435 | B2 | 10/2013 | Gentry |
| 9,037,860 | B1 * | 5/2015 | Kerschbaum ....... G06F 21/6227 713/168 |

(Continued)

FOREIGN PATENT DOCUMENTS

| CN | 105162590 A | 12/2015 |
| CN | 106571905 A | 4/2017 |

OTHER PUBLICATIONS

Mehdi Tibouchi, "Fully Homomorphic Encryption over the Integers: From Theory to Practice", URL: https://www.ntt-review.jp/archive/ntttechnical.php?contents=ntr201407fa5.html, NTT Technical Review—Jul. 2014.

*Primary Examiner* — Meng Li
(74) *Attorney, Agent, or Firm* — Cantor Colburn LLP (57) ABSTRACT

A system and method for converting an input dataset based on a query received via a user interface into one or more defined range values is provided wherein the input dataset is converted into one or more defined range values based on a conversion value matrix. The present invention provides for encrypting the defined range values of the input dataset into a first cipher text matrix. Further, the present invention provides for encrypting the conversion value matrix into second cipher text matrix. The present invention provides for performing a computation operation between the first cipher text matrix and the second cipher text matrix to generate an aggregated cipher text matrix. The present invention provides for decrypting the aggregated cipher text matrix into a decrypted result matrix. The present invention provides for performing an aggregation operation by counting pre-defined digit in each column of the decrypted result matrix.

17 Claims, 6 Drawing Sheets

(56) References Cited

U.S. PATENT DOCUMENTS

| | | | | |
|---|---|---|---|---|
| 10,373,078 B1* | 8/2019 | Agarwal | ................ | G06N 20/00 |
| 2017/0272235 A1* | 9/2017 | Bhagwan | ................ | G06F 7/50 |
| 2017/0310643 A1* | 10/2017 | Hardy | ................ | G06F 21/6254 |
| 2018/0373882 A1* | 12/2018 | Veugen | ................ | G06F 21/602 |
| 2019/0386814 A1* | 12/2019 | Ahmed | ................ | H04L 9/3013 |

* cited by examiner

SYSTEM AND METHOD FOR PERFORMING HOMOMORPHIC AGGREGATION OVER ENCRYPTED DATA

CROSS REFERENCE TO RELATED APPLICATION

This application is related to and claims the benefit of Indian Patent Application Number 201941045254 filed on Nov. 7, 2019, the contents of which are herein incorporated by reference in their entirety.

FIELD OF THE INVENTION

The present invention relates generally to the field of homomorphic encryption and decryption. More particularly, the present invention relates to a system and a method for performing homomorphic aggregation over encrypted data.

BACKGROUND OF THE INVENTION

With more and more infrastructure and applications moving to cloud in support of digital transformation, deployment of increasing amount of data to cloud services for business processing raises new privacy concerns for individuals and businesses alike. The privacy concerns are typically addressed by encrypting the data which is to be moved to the cloud. Encryption of data is becoming even more pertinent in today's society as large organizations are very concerned with breaches and privacy of information.

Conventionally, encryption techniques such as homomorphic encryption allows data to be encrypted that can be outsourced to cloud platforms for further operations. Homomorphic encryption carries out computation on encrypted inputs, keeps internal variables private even from observers who may look into running program, and produces encrypted output accessible only to the user who holds the right cryptographic key. It can be typically used in businesses and organizations across a variety of industries including financial services, retail, information technology, and healthcare to allow people to use data without seeing its unencrypted values. Homomorphic encryption helps to protect the integrity of the data by allowing others to manipulate its encrypted form without understanding or accessing its decrypted values.

Partially homomorphic encryption (PHE) helps sensitive data to remain confidential by only allowing selected computation functions to be performed on encrypted values. That is, one operation can be performed an unlimited number of times on the ciphertext. Some examples of PHE include ElGamal encryption (a multiplication scheme) and Paillier encryption (an addition scheme). A somewhat homomorphic encryption (SHE) scheme is one that supports limited operations (for example, either addition or multiplication) up to a certain complexity, but these operations can only be performed a limited number of times. Fully Homomorphic Encryption (FHE) Scheme supports multiple arbitrary computations over encrypted data like addition, subtraction and multiplication altogether. FHE allows anyone to use encrypted data to perform useful operations without access to the encryption key. In particular, FHE has applications for improving cloud computing security. If someone wants to store encrypted, sensitive data in the cloud but does not trust cloud provider or does not want to run the risk of a hacker breaking in the cloud, fully homomorphic encryption provides with a way to pull, search, and manipulate data without having to allow the cloud provider access to data on the files.

It has been observed that the drawback of using homomorphic encryption is that its versatility comes at the expense of speed and also it is impractically slow. Another problem with the homomorphic encryption scheme is that only basic operations can be performed on the encrypted data like addition, subtraction and multiplication. In its current form, applying aggregation operations like count, average, minimum, maximum over the encrypted data in homomorphic scheme is not possible because of the complexity of encrypted data. As the aggregation operations are not possible over the encrypted data, it is also not possible to perform data analytics over the encrypted data to draw insights from it.

In light of the above drawbacks, there is a need for a system and a method for performing homomorphic aggregation over encrypted data. There is a need for a system and a method for efficiently and securely performing homomorphic aggregation over encrypted data. There is also a need for a system and a method for performing homomorphic aggregation over encrypted data by using minimum human intervention.

SUMMARY OF THE INVENTION

In various embodiments of the present invention, a system for performing homomorphic aggregation over encrypted data is provided. The system comprises an encryption engine executed by a processor executing program instructions stored in a memory. The encryption engine is configured to convert an input dataset based on a query received via a user interface into one or more defined range values. The input dataset is converted into one or more defined range values based on a conversion value matrix. The encryption engine is configured to encrypt the defined range values of the input dataset to a first cipher text matrix. The encryption engine is further configured to encrypt the conversion value matrix into a second cipher text matrix. Further, the encryption engine is configured to transmit the first cipher text matrix and the second cipher text matrix to a computation server for generating an aggregated cipher text matrix. The system further comprises a decryption engine executed by a processor executing program instructions stored in a memory. The decryption engine is configured to receive the aggregated cipher text matrix from the computation sever. The decryption engine is configured to decrypt the aggregated cipher text matrix into a decrypted result matrix. Further, the decryption engine is configured to perform an aggregation operation by counting a pre-defined digit in each column of the decrypted result matrix.

In various embodiments of the present invention, a method for performing homomorphic aggregation over encrypted data is provided. The method is implemented by at least one processor executing program instructions stored in a memory. The method comprises converting an input dataset based on a query received via a user interface into one or more defined range values. The input dataset is converted into one or more defined range values based on a conversion value matrix. Further, the method comprises encrypting the defined range values of the input dataset into a first cipher text matrix. Further, the method comprises encrypting the conversion value matrix into a second cipher text matrix. Further, the method comprises performing a computation operation between the first cipher text matrix and the second cipher text matrix to generate an aggregated cipher text matrix. Further, the method comprises decrypting the aggregated cipher text matrix into a decrypted result matrix. Further, the method comprises performing an aggregation operation by counting a pre-defined digit in each column of the decrypted result matrix.

In various embodiment of the present invention, a computer program product is provided. The computer program product comprises a non-transitory computer readable medium having computer-readable program code stored thereon, the computer readable program code comprising instructions that, when executed by a processor, cause the processor to convert an input dataset based on a query received into one or more defined range values. The input dataset is converted into one or more defined range values based on a conversion value matrix. Further, the converted defined range values of the input dataset are encrypted into a first cipher text matrix. The conversion value matrix is encrypted into a second cipher text matrix. Further, a computation operation is performed between the first cipher text matrix and the second cipher text matrix to generate an aggregated cipher text matrix. The aggregated cipher text is decrypted into a decrypted result matrix. Further, the aggregation operation is performed by counting a pre-defined digit in each column of the decrypted result matrix.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for performing homomorphic aggregation over encrypted data. The present invention provides for a system and a method for conversion of an input dataset into defined ranges for performing homomorphic aggregation. Further, the present invention provides for a system and a method for generating aggregated cipher matrix using XOR function. The present invention further provides a system and a method for decrypting an aggregated cipher text vector of (m×n) dimension using a secret key. Further, the present invention discloses a system and a method for performing an aggregation by counting a pre-defined digit in each column of the decrypted matrix. Further, the present invention provides for a system and a method for conversion of the input dataset into defined ranges for performing homomorphic aggregation based on a query received from a client terminal.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
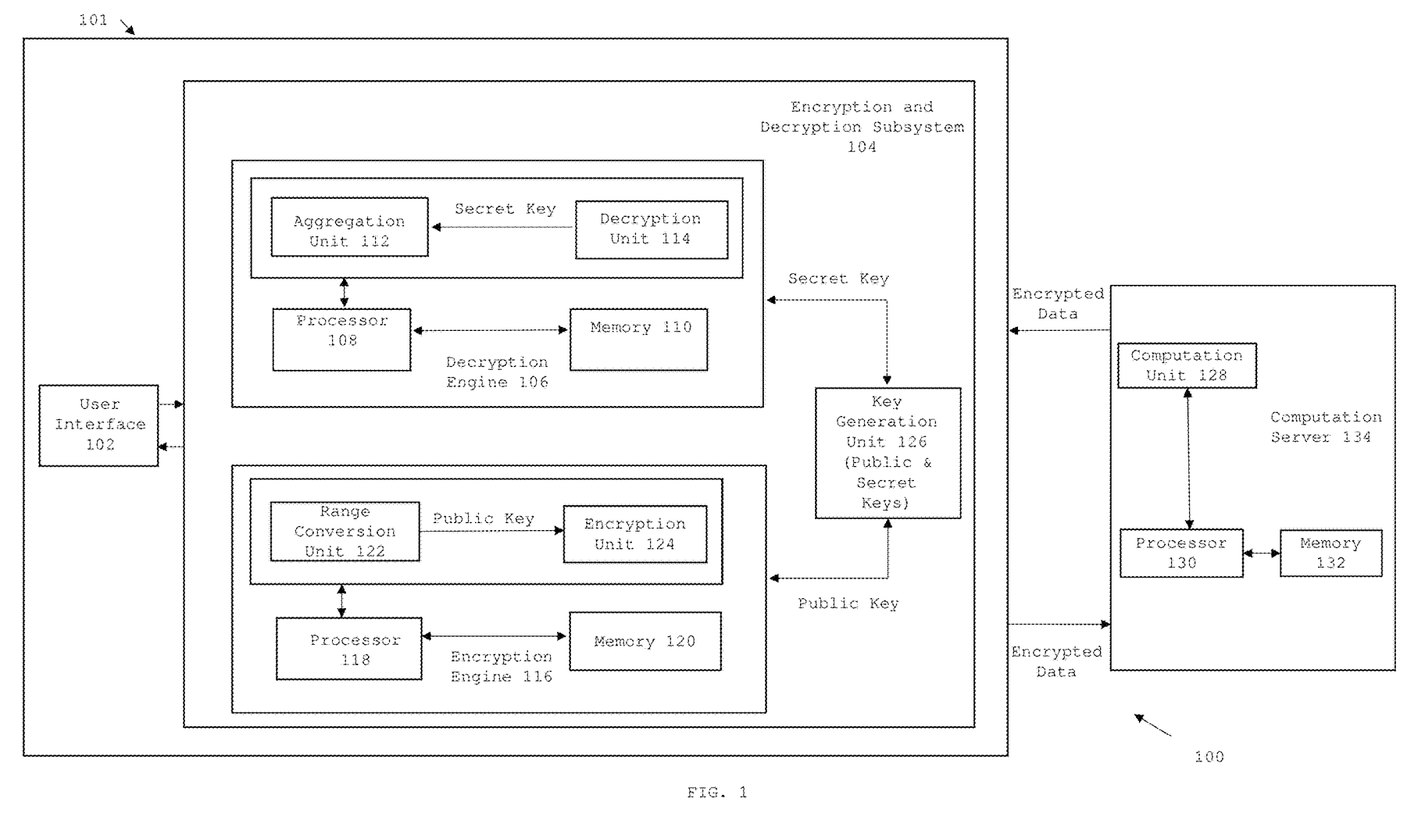
FIG. 1 is a detailed block diagram of a system for performing homomorphic aggregation over encrypted data, in accordance with various embodiments of the present invention.

FIG. 1 is a detailed block diagram of a system 100 for performing homomorphic aggregation of encrypted data, in accordance with various embodiments of the present invention. Referring to FIG. 1, in an embodiment of the present invention, the system 100 comprises a client terminal 101 and a computation server 134. In an embodiment of the present invention, the computation server 134 is hosted in a cloud platform to perform computation operation in accordance with various embodiments of the present invention. The client terminal 101 further comprises a user interface 102 and an encryption and decryption subsystem 104. The client terminal 101 communicates with the computation server 134 via a communication channel (not shown). The communication channel (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

In an embodiment of the present invention, the user interface 102 and the encryption and decryption subsystem 104 are implemented at the client terminal 101. In an exemplary embodiment of the present invention, the client terminal 101 may include, but is not limited to, a smart phone, a computer, a tablet, microcomputer or any other wired or wireless terminal.

In another embodiment of the present invention, the encryption and decryption subsystem 104 may be implemented in a cloud computing architecture in which data, applications, services, and other resources are stored and delivered through shared data-centers. In an exemplary embodiment of the present invention, the functionalities of the subsystem 104 are delivered to a user as software as a service (SaaS) over a communication network.

In operation, in an embodiment of the present invention, a query is received at the user interface 102 of the client terminal 101 for obtaining an aggregation result over an input dataset. The input dataset may be in the form of a vector or a matrix of (m×1) dimension. In an exemplary embodiment of the present invention, the input dataset may be automatically created by an application on the client terminal 101 based on the query received at the user interface 102 from a user.

In an embodiment of the present invention, the encryption and decryption subsystem 104 comprises an encryption engine 116. The encryption engine 116 further comprises a range conversion unit 122 and an encryption unit 124.

In various embodiments of the present invention, the encryption engine 116 has multiple units which work in conjunction with each other for encryption of input datasets. The various units of the encryption engine 116 are operated via the processor 118 specifically programmed to execute instructions stored in the memory 120 for executing respective functionalities of the units of the encryption engine 116 in accordance with various embodiments of the present invention.

Figure 3:
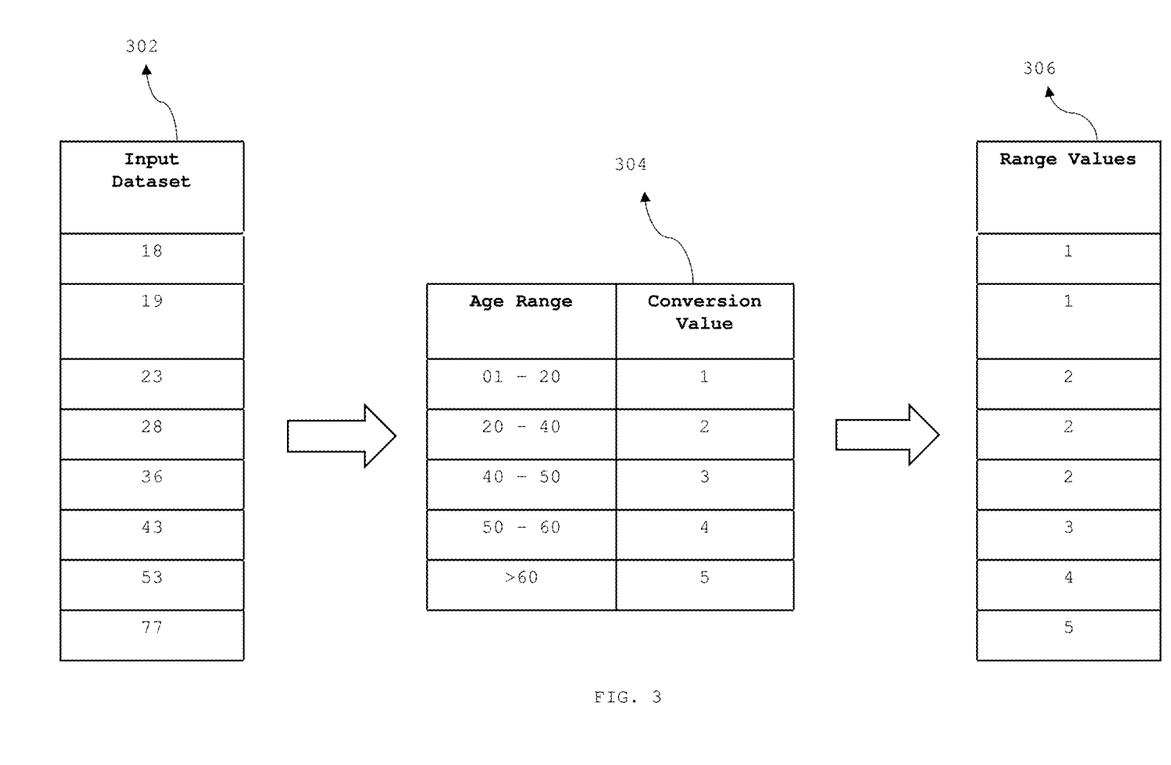
FIG. 3 is a table depicting the conversion of a input dataset into range values, in accordance with various embodiments of the present invention.

In an embodiment of the present invention, the range conversion unit 122 of the encryption engine 116 is configured to receive the input dataset 302 (as shown in FIG. 3) in the form of a matrix from the user interface 102. The range conversion unit 122 then groups the input dataset 302 into a defined range based on a specified condition. The specified condition for conversion of the input dataset 302 is automatically generated based on a query received at the user interface 102.

In an exemplary embodiment of the present invention, the query may correspond to computing a count of the values of the input dataset 302 as per a grouping condition specified in the query received at the user interface 102. In another exemplary embodiment of the present invention, the query may correspond to computing sum of the values of the input dataset 302 as per the grouping condition specified in the query received at the user interface 102. In an exemplary embodiment of the present invention, the input dataset 302 may include numerical values in the form of a vector or a matrix. FIG. 3 illustrates the application range conversion unit 122 performs the conversion to approximate values of the input dataset 302 to the defined ranges.

Referring to FIG. 3, the user interface 102 receives the input dataset 302 in the form of matrix corresponding to the query received at the user interface 102. The input dataset 302 may include values representing ages of employees of a company. In an embodiment of the present invention, the range conversion unit 122 performs conversion of the input dataset 302 as per the specified condition. In an exemplary embodiment of the present invention, the specified condition for conversion of the input dataset 302 by the range conversion unit 122 may be varied as per the query provided at the user interface 102. As shown in FIG. 3, conversion value matrix 304 is representative of the specified condition corresponding to the query, that is applied on the input dataset 302 received at the user interface 102, which is explained in detail herein below.

In this example, the user interface 102 receives the query which relates to extracting a count of employees whose age lies within a particular age range value. According to the specified condition, the age range from 01-20 is assigned a conversion value of 1. Similarly the age range from 20-40 is assigned a conversion value of 2, age range from 40-50 is assigned a conversion value of 3, age range of 50-60 is assigned a value of 4 and the age range greater than 60 is assigned a conversion value of 5. In an embodiment of the present invention, the input dataset 302 is converted into a range values matrix 306 as per the condition specified in the conversion value matrix 304. The range values matrix 306 represent the defined range in this example.

Figure 4:
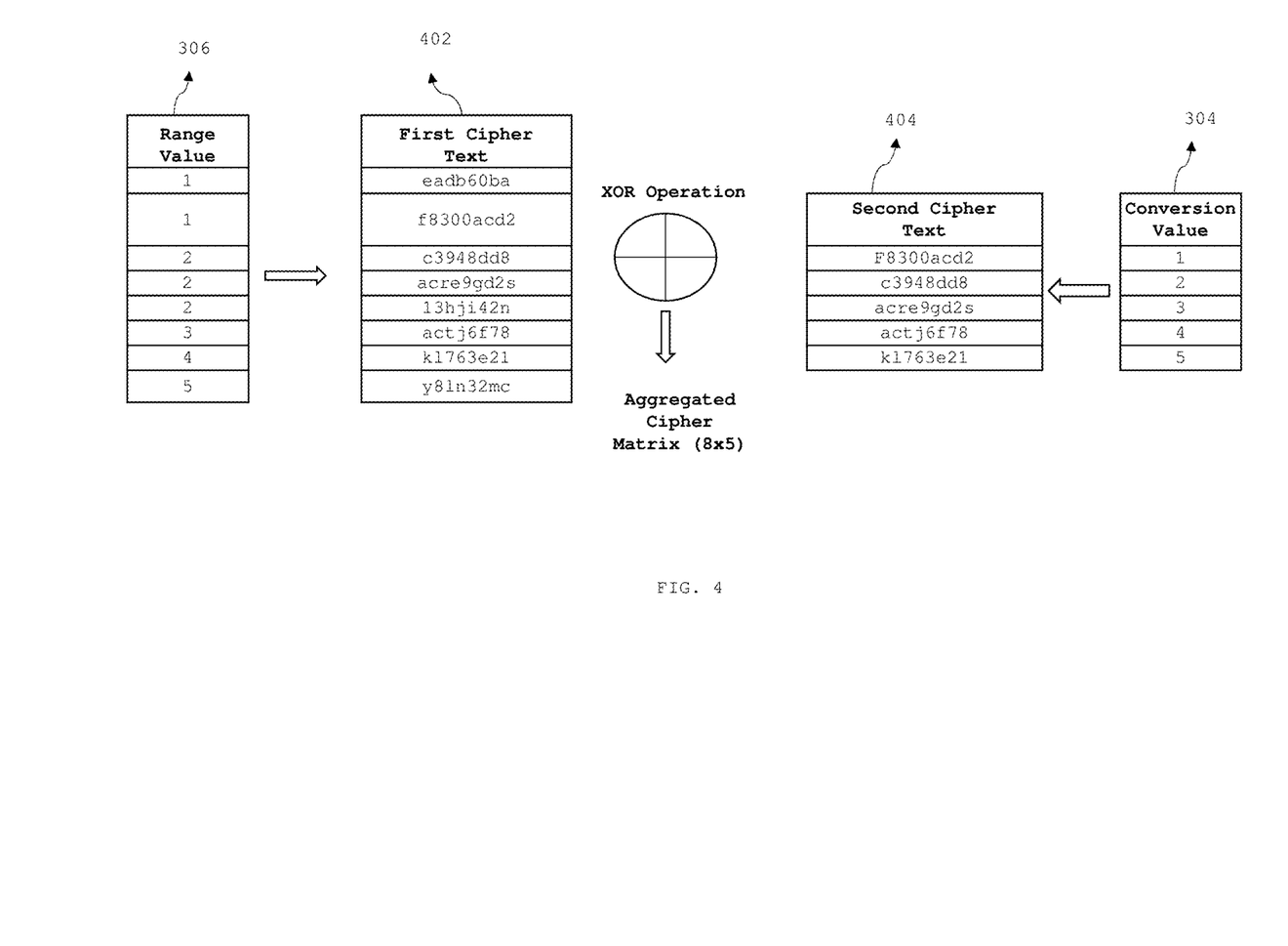
FIG. 4 is a table depicting generation of an aggregated cipher matrix, in accordance with various embodiments of the present invention.

In an embodiment of the present invention, the encryption unit 124 is configured to convert the defined range values matrix 306 provided by the range conversion unit 122 into a first cipher text matrix 402 as shown in FIG. 4. In another embodiment of the present invention, the encryption module 124 is configured to convert the conversion value matrix 304 into a second cipher text matrix 404 as shown in FIG. 4. The encryption of the first cipher text matrix 402 and the second cipher text matrix 404 is performed by using a public key generated by a key generation unit 126 in the encryption and decryption subsystem 104 which is connected to the encryption engine 116 and the decryption engine 106.

In an embodiment of the present invention, the key generation unit 126 is configured to generate the public key and a secret key. In an embodiment of the present invention, the public key is available at the client's terminal 101 and it may also be transferred to the computation server 134.

In various embodiments of the present invention, the computation server 134 has multiple units which work in conjunction with each other for performing computation over the encrypted datasets. The various units of the encryption server 134 are operated via the processor 130 specifically programmed to execute instructions stored in the memory 132 for executing respective functionalities of the units of the computation server 134 in accordance with various embodiments of the present invention. The computation server 134 further comprises a computation unit 128.

In an embodiment of the present invention, the computation server 134 may be located at an offshore site. The encrypted first cipher text matrix 402 and the second cipher text matrix 404 are transmitted to the computation server 134 by the encryption engine 116.

In an embodiment of the present invention, the computation unit 128 of the computation server 134 uses the public key sent from the key generation unit 126 to perform aggregation operations over the first cipher text matrix 402 and the second cipher text matrix 404. In an exemplary embodiment of the present invention, the public key may be BGV based HELib or FV Based seal. The computation unit 128 may be implemented as a hardware component (e.g., standalone computing unit), as a software component (e.g., implemented within an existing computing unit), and/or as a hardware component inserted into an existing computing unit (e.g., plug-in card, attachable unit).

Figure 5:
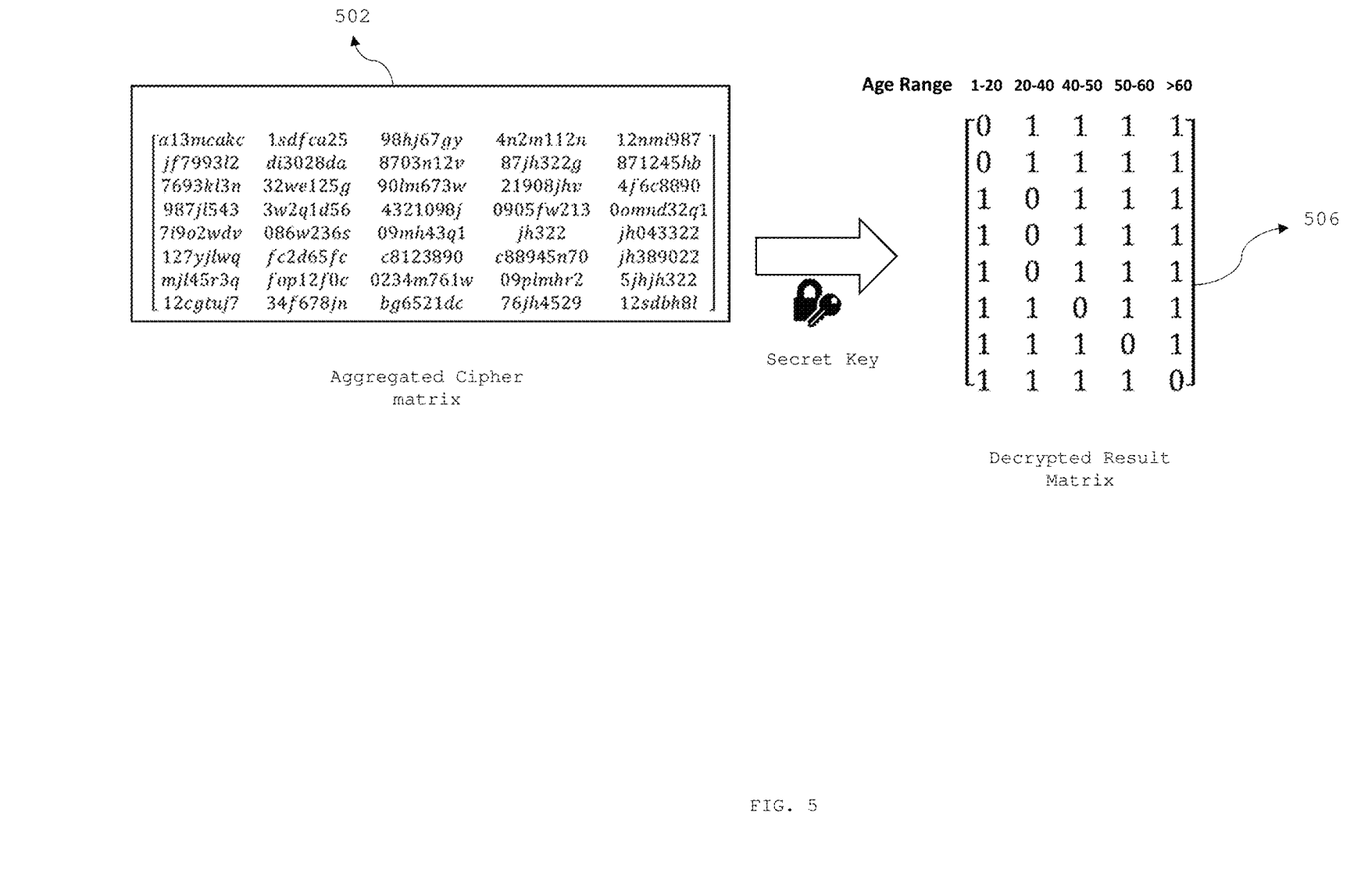
FIG. 5 is a table depicting decryption of the aggregated cipher matrix, in accordance with various embodiments of the present invention.

In an embodiment of the present invention, the computation unit 128 of the computation server 134 generates an aggregated cipher matrix 502 (as shown in FIG. 5) by performing a computation operation over the first cipher text matrix 402 and the second cipher text matrix 404 sent from the encryption and decryption subsystem 104 (as shown in FIG. 4). In an embodiment of the present invention, the computation operation may include performing XOR operation. In an exemplary embodiment of the present invention, the computation unit 128 comprises a plurality of XOR gates for performing a XOR operation over the encrypted range value matrix stored at the computation server 134.

Referring to FIG. 4, in an embodiment of the present invention, the first cipher text matrix 402 corresponds to an encrypted matrix obtained by encrypting a range values matrix 306. The second cipher text matrix 404 corresponds to an encrypted matrix obtained by encrypting the conversion value matrix 304. In various embodiments of the present invention, the input dataset 302 is not accessible by the computation unit 128 and the computation unit 128 does not decrypt the first cipher text matrix 402 and does not decrypt the second cipher text matrix 404 stored at the computation server 134. After performing XOR operation on the first cipher text matrix and the second cipher text matrix, the computation unit 128 generates an aggregated cipher matrix 502 (as shown in FIG. 4 and FIG. 5).

FIG. 4 shows the operations of conversion of the input range values 306 into encrypted text 402 and the creation of the aggregated cipher matrix 502 (as shown in FIG. 5) in accordance with an embodiment of the present invention. The range values matrix 306 is converted by the encryption unit 124 into the first cipher text matrix 402. The conversion value matrix 304 is converted into a second cipher text matrix 404 by the encryption module 124. The computation unit 128 performs XOR operation between the first cipher text matrix 402 and the second cipher text matrix 404 sent from the encryption engine 116 to obtain the aggregated cipher matrix 502. The aggregated cipher matrix 502 (as shown in FIG. 5) is obtained after performing XOR operation over the encrypted range values is stored at the computation server 134.

In an embodiment of the present invention, the encryption and decryption subsystem 104 comprises a decryption engine 106. The decryption engine 106 comprises an aggregation unit 112 and a decryption unit 114. In various embodiments of the present invention, the decryption engine 106 has multiple units which work in conjunction with each other for the decryption of the aggregated cipher matrix. The various units of the decryption engine 106 are operated via the processor 108 specifically programmed to execute instructions stored in the memory 110 for executing respective functionalities of the units of the decryption engine 106 in accordance with various embodiments of the present invention.

In an embodiment of the present invention, the decryption unit 114 accesses the secret key generated by the key generation unit 126 to decrypt the aggregated cipher matrix 502 sent from the computation server 134. The decryption unit 114 in the decryption engine 106 uses the secret key generated by the key generation unit 126 to convert the aggregated cipher matrix 502 into a decrypted matrix.

In an embodiment of the present invention, the aggregation unit 112 performs aggregation operations over the decrypted matrix obtained from the decryption unit 114. In an embodiment of the present invention, the decrypted result matrix 506 is evaluated in the aggregation unit 112 by counting a pre-defined digit in each column of the decrypted matrix. In an embodiment of the present invention, counting the pre-defined digit in each column of the decrypted matrix is executed by a linear search algorithm. In an embodiment of the present invention, an evaluated final result is rendered as an output at the user interface 102 of the client terminal 101.

FIG. 5 shows the aggregated cipher matrix 502 that is sent to the encryption and decryption subsystem 104 via a communication channel from the computation server 134. The decryption unit 114 of the decryption engine 106 decrypts the aggregated cipher matrix 502 into a decrypted result matrix 506 by a secret key supplied by the key generation unit 126. The decrypted result matrix 506 is obtained in the form of a matrix consisting of digits zero '0' and digit '1'. The decrypted result matrix 502 is used by the aggregation unit 112 of the decryption engine 106 for performing aggregation operation by counting a pre-defined digit. In an example, the pre-defined digit may be digit zero '0'. In an example, the count of number of 0's in each column provides the count of the values of the input dataset 302 range values as defined by the range conversion unit 122 based on the grouping condition specified in the query received by the user interface 102. In an example, the count of zeroes in the first column of decrypted result provides the count of the no. of the employees that fall within the age range of 1-20. Similarly the no. of zeroes in the second column provides the count of the employees with the age range between 20 and 40. Similarly count of zeroes in the rest of the columns provides the count of the employees in the rest of the ranges.

Figure 2:
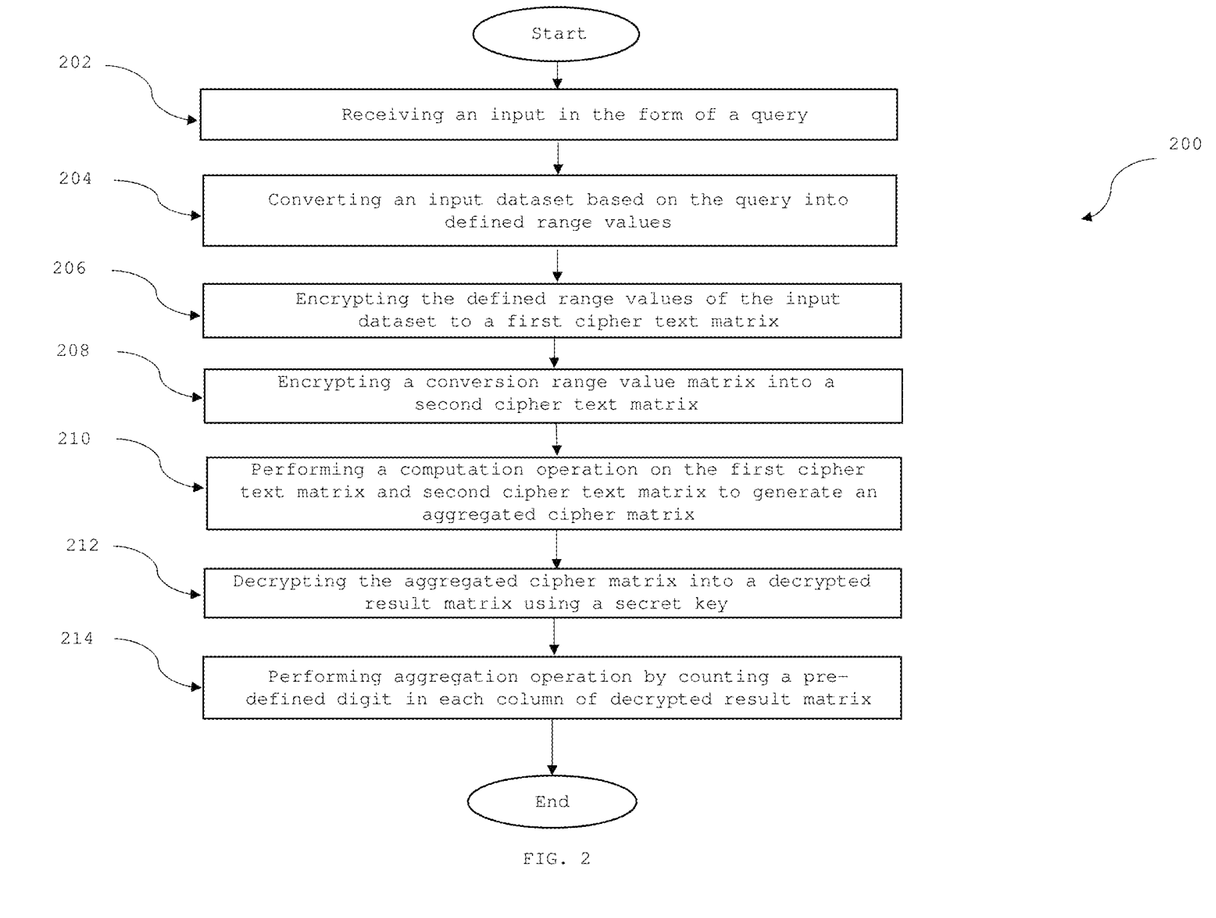
FIG. 2 is a flowchart illustrating a method for performing homomorphic aggregation over encrypted data, in accordance with various embodiments of the present invention.

FIG. 2 is a flowchart illustrating a method for performing homomorphic aggregation over encrypted data, in accordance with various embodiments of the present invention.

At step 202, an input is received from the user in the form of a query. In an embodiment of the present invention, the query may be received for conversion of an input dataset into defined ranges. In an exemplary embodiment of the present invention, the input dataset may be automatically created by an application based on the query received. In operation, in an embodiment of the present invention, the query is received for obtaining an aggregation result over an input dataset. The input dataset may be in the form of a matrix or a vector of (m×1) dimension. In an embodiment of the present invention, the input dataset may include numerical values in the form of a vector. In an exemplary embodiment of the present invention, the query may correspond to computing a count of the values of the input dataset grouped as per a condition provided in the query.

At step 204, the input dataset is converted into defined range values based on the query. In an embodiment of the present invention, the conversion of the input dataset into defined range values is based on the condition provided in the query. At step 206, the defined range values are encrypted to a first cipher text matrix. In an embodiment of the present invention, the encryption of the defined range values is performed by using a public key.

At step 208, the conversion value matrix is encrypted into a second cipher text matrix. In an embodiment of the present invention, the encryption of the conversion values is performed by using a public key. At step 210, an aggregated cipher text matrix is generated by performing a computational operation over the first and the second cipher text matrix. In an embodiment of the present invention, the computational operation includes performing an XOR operation. At step 212, the aggregated cipher matrix is decrypted into decrypted result matrix using a secret key. In an exemplary embodiment of the present invention, the decrypted result matrix consists of digit zero '0' and non-zero digits.

At step 214, an aggregation operation is performed over the decrypted result matrix. In an embodiment of the present invention, the decrypted result matrix is evaluated by counting a pre-defined digit in each column of the decrypted matrix. In an example, the pre-defined digit may be a digit '0' and the count of number of digit '0' in each column provides the count of values in terms of the defined range.

Figure 6:
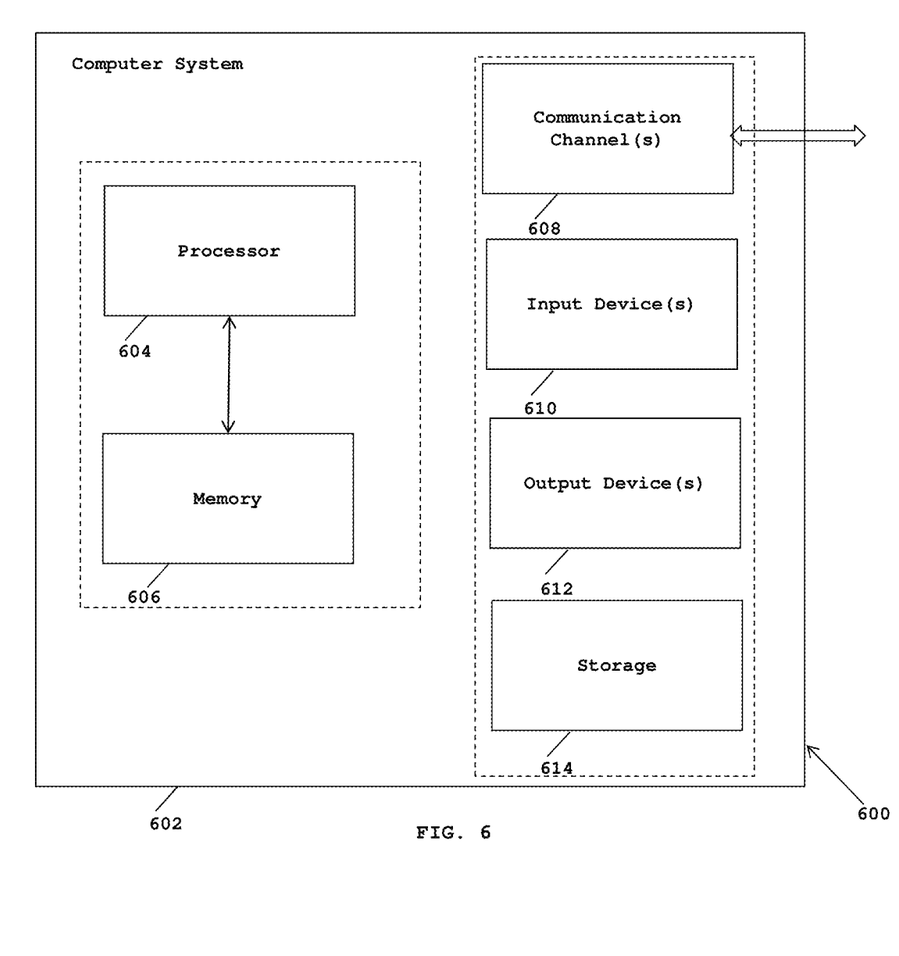
FIG. 6 illustrates an exemplary computer system in which various embodiments of the present invention may be implemented.

FIG. 6 illustrates an exemplary computer system in which various embodiments of the present invention may be implemented. The computer system 602 comprises a processor 604 and a memory 606. The processor 604 executes program instructions and is a real processor. The computer system 602 is not intended to suggest any limitation as to scope of use or functionality of described embodiments. For example, the computer system 602 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 606 may store software for implementing various embodiments of the present invention. The computer system 602 may have additional components. For example, the computer system 602 includes one or more communication channels 608, one or more input devices 610, one or more output devices 612, and storage 614. An interconnection mechanism (not shown) such as a bus, controller, or network, interconnects the components of the computer system 602. In various embodiments of the present invention, operating system software (not shown) provides an operating environment for various softwares executing in the computer system 602, and manages different functionalities of the components of the computer system 602.

The communication channel(s) 608 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 610 may include, but not limited to, a keyboard, mouse, pen, joystick, trackball, a voice device, a scanning device, touch screen or any another device that is capable of providing input to the computer system 602. In an embodiment of the present invention, the input device(s) 610 may be a sound card or similar device that accepts audio input in analog or digital form. The output device(s) 612 may include, but not limited to, a user interface on CRT or LCD, printer, speaker, CD/DVD writer, or any other device that provides output from the computer system 602.

The storage 614 may include, but not limited to, magnetic disks, magnetic tapes, CD-ROMs, CD-RWs, DVDs, flash drives or any other medium which can be used to store information and can be accessed by the computer system 602. In various embodiments of the present invention, the storage 614 contains program instructions for implementing the described embodiments.

The present invention may suitably be embodied as a computer program product for use with the computer system 602. The method described herein is typically implemented as a computer program product, comprising a set of program instructions which is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

Advantages:

In accordance with various embodiments of the present invention, noise generation is significantly minimized as arbitrary arithmetic computations are minimal in number. Further, enhanced security is achieved by way of implementation of various embodiments of the present invention as only ranges of ciphertext are encrypted.

We claim:

1. A system for performing homomorphic aggregation over encrypted data, wherein the system comprises:
    a memory that stores program instructions for performing the homomorphic aggregation over encrypted data;
    a processor configured to execute an encryption engine, wherein the encryption engine is configured to execute the program instructions stored in the memory and to:
    convert an input dataset based on a query received via a user interface into one or more defined range values, wherein the input dataset is converted into one or more defined range values based on a conversion value matrix;
    encrypt the defined range values of the input dataset to a first cipher text matrix;
    encrypt the conversion value matrix into a second cipher text matrix; and
    transmit the first cipher text matrix and the second cipher text matrix to a computation server for generating an aggregated cipher text matrix;
    a decryption engine executed by the processor executing the program instructions stored in the memory and configured to:
    receive the aggregated cipher text matrix from the computation sever;
    decrypt the aggregated cipher text matrix into a decrypted result matrix; and
    perform an aggregation operation by counting a pre-defined digit in each column of the decrypted result matrix.

2. The system as claimed in claim 1, wherein the aggregated cipher text matrix is generated based on a computation operation performed between the first cipher text matrix and the second cipher text matrix in the computation server.

3. The system as claimed in claim 1, wherein the encryption engine comprises a range conversion unit configured to convert the input dataset based on the query received from the user interface into defined range values.

4. The system as claimed in claim 3, wherein the range conversion unit converts the input dataset based on a condition specified in the query received via the user interface.

5. The system as claimed in claim 1, wherein the encryption engine comprises an encryption unit configured to encrypt the converted range values of the input dataset to the first cipher text matrix and encrypt the conversion value matrix into the second cipher text matrix.

6. The system as claimed in claim 1, wherein the decryption engine comprises a decryption unit configured to decrypt the aggregated cipher text matrix into the decrypted result matrix.

7. The system as claimed in claim 1, wherein the decryption engine comprises an aggregation unit configured to perform the aggregation operation by counting the pre-defined digit in each column of the decrypted result matrix, the pre-defined digit being a digit '0'.

8. The system as claimed in claim 1, wherein the system further comprises a key generation unit in communication with the decryption engine and the encryption engine, the key generation unit being configured to generate a secret key for the decryption engine and a public key for the encryption engine.

9. The system as claimed in claim 1, wherein the decryption unit is configured to decrypt the aggregated cipher text matrix using a secret key.

10. The system as claimed in claim 1, wherein the range conversion unit uses the public key to encrypt the defined range values of the input dataset to the first cipher text matrix and encrypt the conversion value matrix into the second cipher text matrix.

11. The system as claimed in claim 1, wherein the encryption engine transmits the first cipher text matrix and the second cipher text matrix to the computation server for generating the aggregated cipher text matrix.

12. A computer implemented method for performing homomorphic aggregation over encrypted data, wherein the method is implemented by at least one processor executing program instructions stored in a memory, the method comprising:
- converting an input dataset based on a query received via a user interface into one or more defined range values, wherein the input dataset is converted into one or more defined range values based on a conversion value matrix;
- encrypting the defined range values of the input dataset into a first cipher text matrix;
- encrypting the conversion value matrix into a second cipher text matrix;
- performing a computation operation between the first cipher text matrix and the second cipher text matrix to generate an aggregated cipher text matrix;
- decrypting the aggregated cipher text matrix into a decrypted result matrix; and
- performing an aggregation operation by counting a pre-defined digit in each column of the decrypted result matrix.

13. The method as claimed in claim 12, wherein the aggregation operation is performed by counting the pre-defined digit in each column of the decrypted result matrix, the pre-defined digit being a digit '0'.

14. The method as claimed in claim 12, wherein a secret key is used to decrypt the aggregated cipher text matrix.

15. The method as claimed in claim 12, wherein a public key is used to encrypt the converted range values of the input dataset to the first cipher text matrix and encrypt the conversion value into the second cipher text matrix.

16. The method as claimed in claim 12, wherein the conversion of the input dataset into the defined range values based on the query is as per a condition specified in the query.

17. A computer program product comprising:
- a non-transitory computer readable medium having computer-readable program code stored thereon, the computer readable program code comprising instructions that, when executed by a processor, cause the processor to:
- convert an input dataset based on a query received into one or more defined range values, wherein the input dataset is converted into one or more defined range values based on a conversion value matrix;
- encrypt the converted defined range values of the input dataset into a first cipher text matrix;
- encrypt the conversion value matrix into a second cipher text matrix;
- perform a computation operation between the first cipher text matrix and the second cipher text matrix to generate an aggregated cipher text matrix;
- decrypt the aggregated cipher text matrix into a decrypted result matrix; and
- perform an aggregation operation by counting a pre-defined digit in each column of the decrypted result matrix.

* * * * *